United States Patent
Kreutz et al.

(10) Patent No.: US 12,497,091 B2
(45) Date of Patent: Dec. 16, 2025

(54) ELECTRICALLY ADJUSTABLE STEERING COLUMN WITH SAFETY CIRCUIT, AND METHOD FOR OPERATING AN ELECTRICALLY ADJUSTABLE STEERING COLUMN

(71) Applicants: thyssenkrupp Presta AG, Eschen (LI); thyssenkrupp AG, Essen (DE)

(72) Inventors: Daniel Kreutz, Feldkirch (AT); Andreas Willi, Lauterach (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 193 days.

(21) Appl. No.: 18/266,126

(22) PCT Filed: Dec. 6, 2021

(86) PCT No.: PCT/EP2021/084461
§ 371 (c)(1),
(2) Date: Jun. 8, 2023

(87) PCT Pub. No.: WO2022/122681
PCT Pub. Date: Jun. 16, 2022

(65) Prior Publication Data
US 2024/0034390 A1 Feb. 1, 2024

(30) Foreign Application Priority Data
Dec. 11, 2020 (DE) .................... 10 2020 215 761.8

(51) Int. Cl.
*B62D 1/183* (2006.01)
*B60W 60/00* (2020.01)
(Continued)

(52) U.S. Cl.
CPC .......... *B62D 1/183* (2013.01); *B60W 60/005* (2020.02); *B62D 1/181* (2013.01); *G07C 5/0808* (2013.01)

(58) Field of Classification Search
None
See application file for complete search history.

(56) References Cited

U.S. PATENT DOCUMENTS

| 4,775,939 A | 10/1988 | Nakashima et al. |
| 2008/0128197 A1* | 6/2008 | Kawaguchi ............ B62D 1/181 180/444 |

(Continued)

FOREIGN PATENT DOCUMENTS

| CN | 103213614 A | 7/2013 |
| CN | 108482476 A | 9/2018 |

(Continued)

OTHER PUBLICATIONS

English Translation of International Search Report issued in PCT/EP2021/084461, dated Mar. 15, 2022.

*Primary Examiner* — Tamara L Weber
(74) *Attorney, Agent, or Firm* — thyssenkrupp North America, LLC

(57) ABSTRACT

The present disclosure relates to an electrically adjustable steering column for a motor vehicle, comprising a positioning unit on which a steering control element can be arranged, a support unit by which the positioning unit is held in an adjustable manner, an adjustment device which is configured to adjust the positioning unit relative to the support unit and which comprises, for the adjustment of the positioning unit, an electric motor. The steering column further has a control unit, wherein the control unit is configured to activate the electric motor. The control unit is further configured, for the activation of the electric motor, to generate a first signal and a second signal, wherein the activation of the electric motor (Continued)

requires the presence of the first signal and of the second signal, in particular at a first switch unit and a second switch unit of the control unit which are connected in series with the electric motor.

17 Claims, 4 Drawing Sheets

(51) Int. Cl.
  *B62D 1/181* (2006.01)
  *G07C 5/08* (2006.01)

(56) References Cited

U.S. PATENT DOCUMENTS

| | | | |
|---|---|---|---|
| 2008/0191455 A1* | 8/2008 | Bechtel | B62D 1/181 |
| | | | 280/775 |
| 2016/0200344 A1 | 7/2016 | Sugioka et al. | |
| 2018/0370559 A1* | 12/2018 | Swamidason | B62D 1/181 |
| 2019/0016365 A1* | 1/2019 | Swamidason | B62D 1/185 |
| 2019/0185041 A1 | 6/2019 | Shin et al. | |
| 2019/0248403 A1* | 8/2019 | Lubischer | B62D 1/28 |
| 2020/0039562 A1 | 2/2020 | Patel et al. | |
| 2021/0124349 A1* | 4/2021 | Koehler | B62D 1/185 |
| 2021/0291890 A1 | 9/2021 | Kreutz et al. | |
| 2023/0079227 A1* | 3/2023 | Suzuki | B62D 5/0406 |
| | | | 701/41 |

FOREIGN PATENT DOCUMENTS

| | | |
|---|---|---|
| DE | 102018221992 A1 | 6/2019 |
| DE | 10 2019 108 466 A1 | 2/2020 |
| DE | 10 2019 120 543 A1 | 2/2020 |
| EP | 3042825 A1 | 7/2016 |

* cited by examiner

ELECTRICALLY ADJUSTABLE STEERING COLUMN WITH SAFETY CIRCUIT, AND METHOD FOR OPERATING AN ELECTRICALLY ADJUSTABLE STEERING COLUMN

CROSS REFERENCE TO RELATED APPLICATIONS

This application is a U.S. National Stage Entry of International Patent Application Serial Number PCT/EP2021/084461, filed Dec. 6, 2021, which claims priority to German Patent Application No. DE 10 2020 215 761.8, filed Dec. 11, 2020, the entire contents of all of which are incorporated herein by reference.

FIELD

The present disclosure generally relates to an adjustable steering column for a motor vehicle, and specifically to an electrically adjustable steering column with a safety circuit, and a method for operating the electrically adjustable steering column.

BACKGROUND

An electrically adjustable steering column, which is configured for adjustment between a stowed position and an operating position, is known from publication DE 10 2019 108 466 A1. In the operating position, which corresponds to an extended position within an adjustment range, a vehicle can be controlled in a manual driving mode by a driver. In the stowed position, which corresponds to a retracted position within an adjustment range, a motor vehicle can in particular be controlled autonomously in an autonomous driving mode without control interventions by a driver. In order to increase safety, it is here provided that a position of the positioning unit of the steering column relative to the support unit is determined. The determined position is taken into account in particular when motor vehicle restraining systems, such as airbags, are triggered.

Publication DE 10 2019 120 543 A1 further discloses an adjustable steering column in which actuating positions of the positioning unit are detected. The detected actuating positions are then evaluated such that an adjustment in a particular position within the scope of specified permitted adjustments takes place.

The possibility of adjusting a steering column, and thus a steering control element arranged thereon, between a stowed position and an operating position also entails new risks for the operation of a motor vehicle, since unintentional changing between the stowed position and the operating position in particular is to be prevented. This is because control interventions by a driver are not possible or are possible to only a limited extent in the stowed position.

Thus a need exists to provide an improved steering column and to make possible safer operation of a steering column. In particular, the risk of inadvertent stowing is to be reduced.

In order to achieve this, a steering column and a method for operating a steering column as claimed in the independent claims are proposed. Further advantageous embodiments of the disclosure are described in the dependent claims and in the description and illustrated in the figures.

BRIEF DESCRIPTION OF THE FIGURES

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
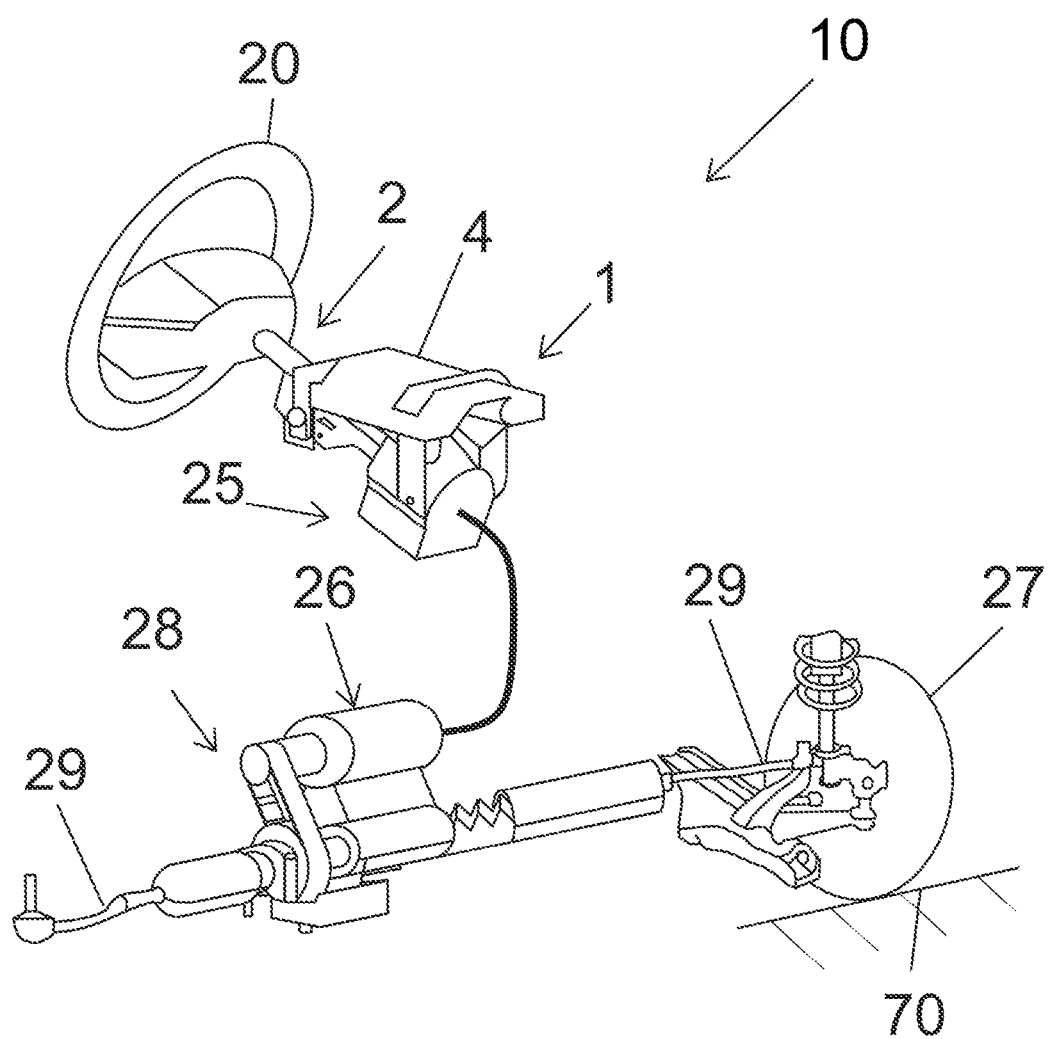
FIG. 1 shows an exemplary embodiment of a steering system having a steering column configured in accordance with the disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The disclosure relates to an electrically adjustable steering column for a motor vehicle, having an positioning unit on which a steering control element can be arranged, having a support unit by which the positioning unit is held in an adjustable manner, having an adjustment device which is configured to adjust the positioning unit relative to the support unit and which comprises, for the adjustment of the positioning unit, at least one electric motor, and having a control unit, wherein the control unit is configured to activate the at least one electric motor. The disclosure relates further to a method for operating a steering column, wherein, for the adjustment of an positioning unit from a stowed position into an operating position by means of an adjustment device of the steering column, a control unit of the steering column activates at least one electric motor of the adjustment device.

The proposed solution provides an electrically adjustable steering column for a motor vehicle, wherein the steering column has an positioning unit on which a steering control element, in particular a steering wheel, can be arranged, a support unit by which the positioning unit is held in an adjustable manner, an adjustment device, and a control unit. The adjustment device is configured to adjust the positioning unit relative to the support unit and comprises, for the adjustment of the positioning unit, at least one electric motor. The control unit of the steering column is configured to activate the at least one electric motor of the adjustment device and, for the activation of the at least one electric motor, to generate a first signal and a second signal. Activation of the at least one electric motor requires the presence of the first signal and of the second signal. Thus, advantageously, the at least one electric motor is not activated if only one of the signals is present, that is to say, for example, if only the first signal or only the second signal is present. A redundancy is thus advantageously created, which prevents the at least one electric motor from being unintentionally activated, and thus unintentional adjustment of the positioning unit, if one of the signals is unintentionally present. Such unintentional presence of a signal could be caused, for example, by a hardware fault, in particular by a hardware fault in the power electronics of the steering column, further in particular by a hardware fault in the inverter of the steering column. For example, a permanently conducting MOSFET (MOSFET: metal-oxide semiconductor field-effect transistor) could inadvertently energize the at least one electric motor. By means of the present disclosure, such inadvertent energization is advantageously prevented in that at least one further signal must be present in order that the at least one electric motor can be energized.

In particular, it is provided that the first signal is a signal that is different from the second signal. Advantageously, the first signal and the second signal are two signals that are independent of each other. In particular, it is provided that at least the first signal is generated independently of the second signal, or that at least the second signal is generated independently of the first signal. Preferably, the first signal and/or the second signal are electrical signals.

According to an advantageous embodiment of the disclosure, it is provided that the control unit has a logic unit. The logic unit is configured to generate the first signal and the second signal. In particular, the logic unit is configured to generate the first signal independently of the second signal. In particular, it is provided that the logic unit is configured such that a condition which can lead to the generation of the first signal and to the generation of the second signal is tested separately for the generation of the first signal and for the generation of the second signal. A corresponding logic component is advantageously redundantly present. In particular, it is provided that a different condition must be met for the generation of the second signal than for the generation of the first signal, and/or that an additional condition must be met for the generation of the second signal.

A further particularly preferred embodiment provides that the at least one electric motor is connected in a serial connection, wherein the at least one electric motor can be connected in series in an electrically conducting manner to a voltage source by way of the serial connection. In particular, it is provided that, in the case of a steering column configured in accordance with the disclosure and installed in a motor vehicle, the at least one electric motor is connected in an electrically conducting manner to a voltage source of the motor vehicle, in particular to a voltage source of the on-board power supply.

Further advantageously, the control unit of the steering column comprises a first switch unit and a second switch unit. It is here advantageously provided that the first switch unit is switched by the presence of the first signal and the second switch unit is switched by the presence of the second signal. That is to say, the first switch unit is in particular configured to switch when the first signal is present at this first switch unit, and the second switch unit is in particular configured to switch when the second signal is present at this second switch unit. In the position of the switch units that is obtained as a result of the presence of the first signal and the presence of the second signal, activation of the at least one electric motor is advantageously made possible. In particular, it is provided that the logic unit is configured to activate the first switch unit independently of the second switch unit.

According to a further advantageous embodiment, the first switch unit and the second switch unit are connected in series with the at least one electric motor. It is thus provided in particular that the at least one electric motor can be energized only when the first switch unit and the second switch unit are each in a switching state in which they establish an electrically conducting connection between a voltage source, in particular the on-board power supply of a motor vehicle, and the at least one electric motor. Advantageously, inadvertent closing of only one of the switch units does not lead to inadvertent energization of the at least one electric motor.

A further advantageous embodiment provides that the first switch unit comprises an inverter. In particular, it is provided that the first switch unit is an inverter. The inverter is advantageously configured to generate a motor activation signal, in particular a motor activation signal for the at least one electric motor, in dependence on the first signal. In particular, the motor activation signal is a voltage which can vary in terms of level and/or frequency, in particular in dependence on the first signal.

According to a further advantageous embodiment, the second switch unit comprises a transistor, preferably a MOSFET. In particular, it is provided that the second switch unit is a transistor, preferably a MOSFET. The second signal is here in particular a switching voltage for switching the transistor.

Advantageously, the second switch unit is open, in terms of the circuit, when the second signal is not present, and the second switch unit is closed, in terms of the circuit, when the second signal is present. This thus means that an electrically conducting connection can be established in this embodiment only when the second signal is present. In particular, it is provided that the second switch unit comprises for this purpose a self-closing MOSFET. An advantageous embodiment variant of the disclosure thus provides a series circuit comprising an inverter as the first switch unit, a MOSFET as the second switch unit, and an electric motor, wherein the inverter is controlled by means of a first signal and the MOSFET is controlled by means of the second signal. Activation of the electric motor is thus possible only when both signals are present.

According to a further advantageous embodiment variant, it is provided that the second switch unit is closed, that is to say electrically conducting, when the second signal is present and is open, that is to say electrically non-conducting, when the second signal is not present. In normal operation, the second signal is advantageously permanently present at the second switch unit. In this embodiment variant, the control unit comprises a diagnostic unit, wherein the diagnostic unit is configured to detect a fault in respect of the activation of the at least one electric motor, wherein the control unit is further configured to interrupt the second generated signal that is present if the diagnostic unit has detected a fault in respect of the activation of the at least one electric motor, and thus there is a deviation from normal operation. In this case, the second signal can in particular be a voltage-free signal, and the second switch unit can be a self-conducting MOSFET. An interruption of the second signal here means that a voltage is applied to the self-conducting MOSFET, so that this MOSFET closes.

An advantageous development of the proposed steering column provides that the control unit of the steering column is further configured to generate the second signal when a request signal for adjustment of the positioning unit is received by the control unit and, by way of an interface of the steering column, an enable signal is received by the control unit, wherein the enable signal is a signal generated by a driver of the motor vehicle or a signal generated by the motor vehicle. A request signal can in particular be triggered by actuation of an operating element with which the steering column can be adjusted by a user of the vehicle. A request signal can additionally be triggered in particular if a driver wishes to change between a manual driving mode and an autonomous driving mode. In addition, a request signal can be triggered in particular if a particular state with which an adjustment of the steering column is associated has been detected by the motor vehicle, for example an adjustment to reduce the risk of injury in the event of an accident of the motor vehicle or an adjustment to make it easier for a driver to enter or exit the vehicle.

According to a further advantageous embodiment, the steering column comprises an interface, in particular a first interface, for connecting the steering column to an on-board power supply of a motor vehicle. By way of this interface, connection of the steering column to the on-board power supply, and in particular the proposed advantageous connection of the at least one electric motor of the adjustment device of the steering column, can advantageously be carried out particularly easily on installation of the steering column into a motor vehicle. Further advantageously, the steering column comprises an interface, in particular a second interface, for connecting the steering column to a central control unit of a motor vehicle. Advantageously, a transfer of signals between the control unit of the steering column and the central control unit of the motor vehicle is made possible by way of this interface.

According to a further advantageous embodiment, the control unit is configured to activate the at least one electric motor of the adjustment device of the steering column in such a manner that the positioning unit of the steering column is moved from a stowed position into an operating position or from an operating position into a stowed position. The control unit is here in particular further configured to receive a confirmation signal from a central control unit of the motor vehicle by way of an interface of the steering column, in particular by way of the second interface. The confirmation signal is advantageously sent by the central control unit of the motor vehicle when the motor vehicle is in autonomous driving operation or when the motor vehicle is stationary. Both in the case of autonomous driving operation and when the motor vehicle is stationary, manual steering interventions by a driver are not necessary, so that, when the vehicle is in these states, adjustment between an operating position and a stowed position is generally possible without risk. In other vehicle states, movement from the operating position into the stowed position is advantageously prevented.

The method for operating a steering column which is likewise proposed for achieving the objects underlying the disclosure provides in particular that the steering column is used as intended in a motor vehicle. In particular, it is provided that the steering column is a steering column configured in accordance with the disclosure, which has the above-mentioned features individually or in combination. The proposed method provides that, for the adjustment of an positioning unit by means of an adjustment device of the steering column, in particular for the adjustment of an positioning unit from a stowed position of the steering column into an operating position of the steering column, a control unit of the steering column activates at least one electric motor of the adjustment device. For the activation of the at least one electric motor, the control unit generates a first signal and a second signal, wherein the first signal is applied to a first switch unit and the second signal is applied to a second switch unit. The first switch unit and the second switch unit are preferably connected in series with the at least one electric motor.

The at least one electric motor advantageously adjusts the positioning unit when the first signal is present at the first switch unit and in addition the second signal is present at the second switch unit. That is to say, the first signal and the second signal must in particular be present at the same time at the respective switch units in order that an electric motor of the adjustment device can be activated and thus the positioning unit can be adjusted.

Advantageously, the method further provides that an adjustment request is received by the control unit of the steering column, wherein, on receiving the adjustment request, the first signal is generated. Advantageously, an enable signal from a driver input or from a motor vehicle controller is further received by the control unit, wherein, on receiving the enable signal, the second signal is generated. In particular, it is provided that the adjustment request is sent by the central control unit of the motor vehicle on transfer from manual driving operation to autonomous driving operation, wherein in this example the adjustment request in particular provides adjustment of the steering column from an operating position into a stowed position. However, in order for the adjustment process from the operating position into the stowed position to actually be carried out, the enable signal must advantageously have been received and the second signal must be present. In particular, it is provided that a driver is asked to confirm that the adjustment process is carried out. Confirmation by the driver is advantageously carried out by actuation of an input element, wherein, on actuation of the input element, the control unit of the steering column receives the enable signal and generates the second signal. In the absence of confirmation by the driver, the positioning unit is advantageously not adjusted. As an advantageous alternative, which in particular can also be used in addition, it is provided that it is confirmed by the central control unit of the motor vehicle, in particular by evaluation of at least one sensor signal, that the transfer from manual driving operation to autonomous driving operation has taken place, and, when confirmation has been made, the enable signal is generated. Receiving of the enable signal then again has the result that the control unit generates the second signal and the adjustment process can be carried out. In the absence of confirmation, the control unit does not receive an enable signal and an adjustment process is advantageously not carried out.

In the various figures, the same parts are generally provided with the same reference signs and will therefore sometimes also be explained in connection with only one of the figures.

FIG. 1 shows an exemplary embodiment of a steering system 10, which by way of example is in the form of a steer-by-wire steering system. The steering system 10 comprises a steering column 1 having an positioning unit 2 on which there is arranged a steering wheel as a steering control element 20. The steering column 1 further comprises a support unit 4 by which the positioning unit 2 is held in an adjustable manner. On a steering shaft of the positioning unit 2 there is mounted an angle of rotation sensor (not shown), which detects a driver steering torque applied by rotation of the steering control element 20. There is further arranged on the steering shaft a feedback actuator 25, which serves to transmit the feedback from the road 70 to the steering control element 20 and thus to give the driver feedback about the steering and driving behavior of the vehicle. The driver's steering intention is transmitted by way of the angle of rotation, measured by the angle of rotation sensor, of the steering shaft by way of signal lines to a control unit (not explicitly shown in FIG. 1). This control unit activates an electrical steering actuator 26 in dependence on the signal from the angle of rotation sensor and on further input variables, in particular the vehicle speed or the yaw rate. The steering actuator 26 controls the position of the steered wheels 27. By means of a screw drive 28, the steering actuator 26 effects an axial displacement of a toothed bar. The steered wheels 27 are connected to the toothed bar by way of tie rods 29.

An exemplary embodiment of a steering column 1 for such a steering system 10 will be explained in greater detail hereinbelow with reference to FIG. 2 and FIG. 3.

Figure 2:
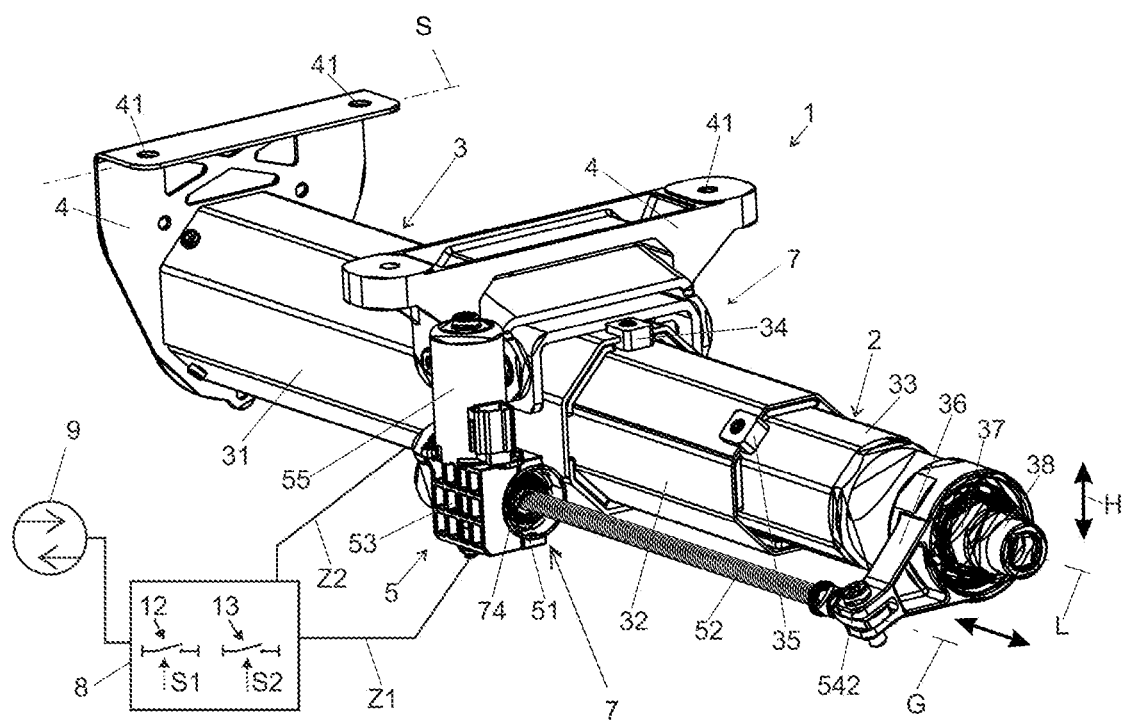
FIG. 2 shows an exemplary embodiment of a steering column configured in accordance with the disclosure.

FIG. 2 shows an exemplary embodiment of a steering column 1 configured in accordance with the disclosure in a schematic perspective view, from top left, of the rear end, based on the direction of travel of a vehicle (not shown), where a steering wheel (not shown here) is held in the operating range. FIG. 3 shows the steering column 1 in a view from the opposite side, that is to say seen from top right.

The steering column 1 comprises an positioning unit 2, wherein a steering control element can be arranged on a steering shaft 37 of the positioning unit 2. The positioning unit 2 is held in an adjustable manner by a support unit 4. For adjustment of the positioning unit 2 relative to the support unit 4, the steering column comprises an adjustment device 7, which in this exemplary embodiment comprises two adjusting units 5, 6 each having an electric motor 55, 65.

The steering column 1 in this exemplary embodiment further comprises a casing unit 3, which has an outer casing tube 31, an intermediate casing tube 32, and an inner casing tube 33. The casing tubes 31, 32 and 33 are arranged axially, in the axial direction of a longitudinal axis L, so as to be adjustable coaxially inside one another in a telescopic manner, as indicated by a double arrow.

At the rear end of the outer casing tube 31 there is mounted a stop 34, which projects inward at the open end into the gap between the outer casing tube 31 and the intermediate casing tube 32. On extension, the intermediate casing tube 32 abuts the stop 34 axially and is secured against becoming separated from the outer casing tube 31. At the rear end of the intermediate casing tube 32 there is mounted a stop 35 which projects inward into the gap between the intermediate casing tube 32 and the inner casing tube 33 and secures the inner casing tube 33 against being pulled out of the intermediate casing tube 32.

Figure 3:
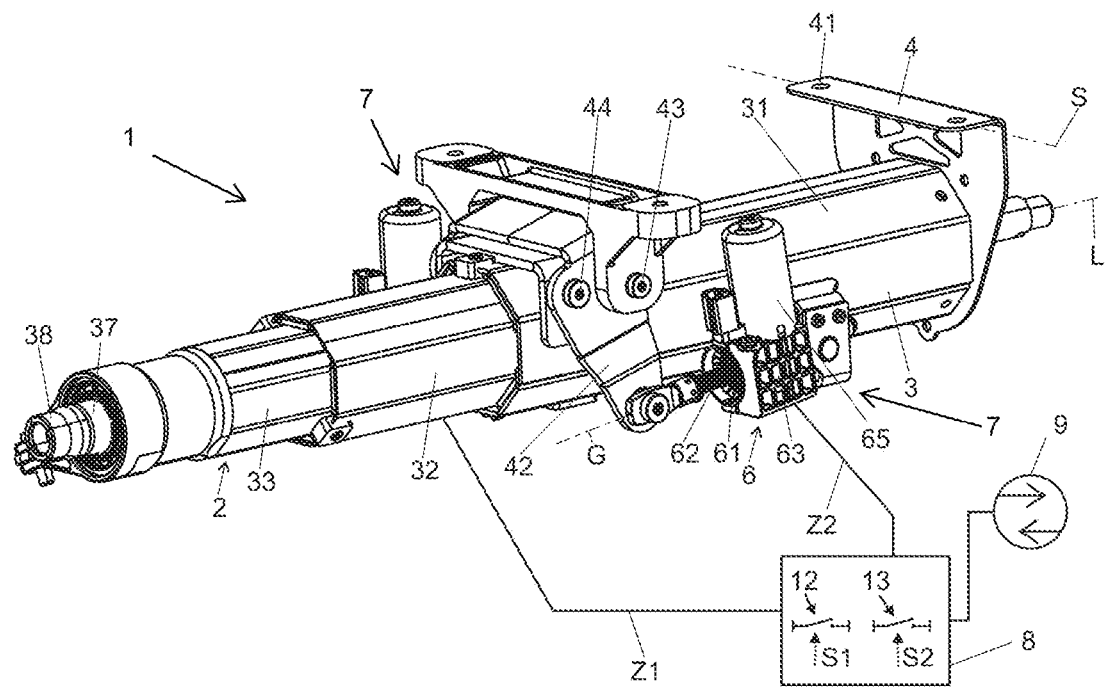
FIG. 3 shows a further representation of the embodiment of FIG. 2.

A steering spindle 37 is mounted in the casing unit 3 so as to be rotatable about the longitudinal axis L and has at its rear end a connection portion 38 for attachment of a steering control element (not shown in FIG. 2 and FIG. 3). The steering spindle 37, like the casing unit 3, is likewise configured to be telescopic in the longitudinal direction. The positioning unit 2 of the steering column 1 comprises the inner casing tube 33 together with the steering spindle 37 mounted therein. In order to achieve longitudinal adjustment relative to the casing unit 3, the positioning unit 2 is held in the outer casing tube 31 so as to be displaceable in a telescopic manner in the direction of the longitudinal axis L, in order to allow the steering control element which can be connected to the steering spindle 37 to be positioned forward and back in the longitudinal direction relative to the support unit 4, as indicated by the double arrow parallel to the longitudinal axis L.

The casing unit 3 is held in a two-part support unit 4, which has fastening means 41 for connection to a vehicle body (not shown).

The casing unit 3, in its front region, is mounted so as to be pivotable relative to the vehicle body about a horizontal pivot axis S, shown schematically, lying transverse to the longitudinal axis L. For this purpose, a pivot bearing (not shown) is arranged in the support unit 4 or between the support unit 4 and the vehicle body. In the rear region, the casing unit 3 is connected to the support unit 2 by way of an actuating lever 42. By means of a rotation movement of the actuating lever 42 by means of the adjusting unit 6 of the adjustment device 7 of the steering column 1, as shown in FIG. 3, the casing unit 3, together with the positioning unit 2, can be adjusted, in particular pivoted, relative to the support unit 4 about the pivot axis S, which lies horizontally in the installed state, whereby a steering control element which can be attached to the fastening portion 38 can in particular be adjusted in the vertical direction H, which is indicated by the double arrow.

The further adjusting unit 5 of the adjustment device 7 of the steering column 1 is, as shown in FIG. 2, configured in particular for the longitudinal adjustment of the positioning unit 2 relative to the casing unit 3 in the direction of the longitudinal axis L. In this exemplary embodiment, the further adjusting unit 5 has a spindle drive having a spindle nut 51 having an internal thread 74 extending along a spindle axis G, into which a threaded spindle 52 engages, that is to say is screwed with its external thread into the corresponding internal thread 74 of the spindle nut 51. In this exemplary embodiment, the threaded spindle axis of the threaded spindle 52 is identical with the spindle axis G and runs substantially parallel to the longitudinal axis L.

The spindle nut 51 is mounted so as to be rotatable about the spindle axis G in a bearing housing 53, which is fixedly connected to the outer casing tube 31 of the casing unit 4. In the direction of the spindle axis G, the spindle nut 51 is supported axially on the casing unit 4 by way of the bearing housing 53. In this exemplary embodiment, the adjusting unit 5 corresponds to a so-called plunger type spindle drive.

The threaded spindle 52 is connected at its free end, supported in a rotationally fixed and axially fixed manner on an arm 36, to the inner casing tube 33, and the spindle nut 51 is supported axially, that is to say in the longitudinal direction, on the outer casing tube 31 by way of the drive unit 53. The longitudinal direction corresponds to the direction of the longitudinal axis L. By a relative rotation of the adjustment device 7 by means of the electric motor 55, the threaded spindle 52 and the spindle nut 51 are moved together or apart depending on the direction of rotation, whereby the inner casing tube 33 is moved into or out of the intermediate casing tube 32 and the intermediate casing tube is moved into or out of the outer casing tube 31, as indicated by the double arrow. A steering wheel which can be attached to the connection portion 38 can thereby be moved forward into a stowed position 200, as outlined in FIG. 4a, or into an operating position 204, 205, 206 in the operating range, as outlined in FIG. 4b. In the stowed position 200, the inner casing tube 33 and the intermediate casing tube 32 have been moved into the outer casing tube 31, that is to say pushed in forward. In the operating position 204, 205, 206, the casing tubes 31, 32 and 33 have been moved out of one another in a telescopic manner.

In FIG. 3, which shows a perspective view of the steering column 1 from the side located at the rear in FIG. 2, it can be seen how the adjusting unit 6 of the adjustment device 7 is attached to the steering column 1 for adjustment in the vertical direction H. This adjusting unit 6 is in principle constructed in the same manner as the further adjusting unit 5 of the adjustment device 7. The adjusting unit 6 likewise comprises a spindle nut 62, in the internal thread of which a threaded spindle 62 engages along a spindle axis G. The threaded spindle 62 is mounted so as to be rotatable about the axis G in a bearing housing 63, which is fastened to the casing unit 3, and supported axially, in the direction of the axis G, on the casing unit 3, and can be driven in rotation in both directions of rotation about the axis G by an electric motor 65.

In the embodiment shown, the adjusting units 5, 6 of the steering column 1 are so-called plunger type spindle drives. Alternatively, in particular a rotary spindle drive can also be formed, in which the spindle nut 51 is held in respect of rotation on the steering column 1 and the threaded spindle 52 can be driven in rotation by the motor 55.

The adjusting unit 6 engages the end of the two-arm actuating lever 42, which is mounted on the support unit 4 so as to be rotatable about a pivot bearing 43, and the other arm of which is connected at the other end in a further pivot bearing 44 to the casing unit 3.

For the activation of the electric motors 55, 65 of the adjustment device 7, the steering column 1 comprises a control unit 8, which is shown only symbolically in FIG. 2 and FIG. 3. By way of lines Z1, Z2 which are likewise shown only symbolically in FIG. 2 and FIG. 3, the control unit 8 is connected to the electric motors 55, 65. The control unit 8 is configured, for the activation of the electric motors, to generate a first signal S1 and, independently thereof, a second signal S2. The control unit 8 comprises a first switch unit 12 and a second switch unit 13, wherein the first switch unit 12 is switched by the presence of the first signal S1 and the second switch unit 13 is switched by the presence of the second signal S2. Activation of the electric motors 55, 65 requires the presence of the first signal S1 and the presence of the second signal S2. Further details of a possible configuration of the control unit 8 will be explained with reference to FIG. 5 and FIG. 6.

The steering column 1 further comprises an interface 9, which is likewise shown only symbolically in FIG. 2 and FIG. 3. By way of the interface 9, the steering column can be connected to an on-board power supply of a motor vehicle, in particular in order to provide the electrical energy required for the adjustment of the electric motors 55, 65. The steering column 1 can further be connected by way of the interface 9 to a central control unit of the motor vehicle. In this manner, the control unit 8 of the steering column can advantageously exchange data with the central control unit. In particular, it can be communicated to the control unit 8 by way of the interface 9 that the motor vehicle is in autonomous driving operation, which can be a requirement for adjustment of the positioning unit 2 from an operating position 204, 205, 206 into a stowed position 200.

Figure 4A:
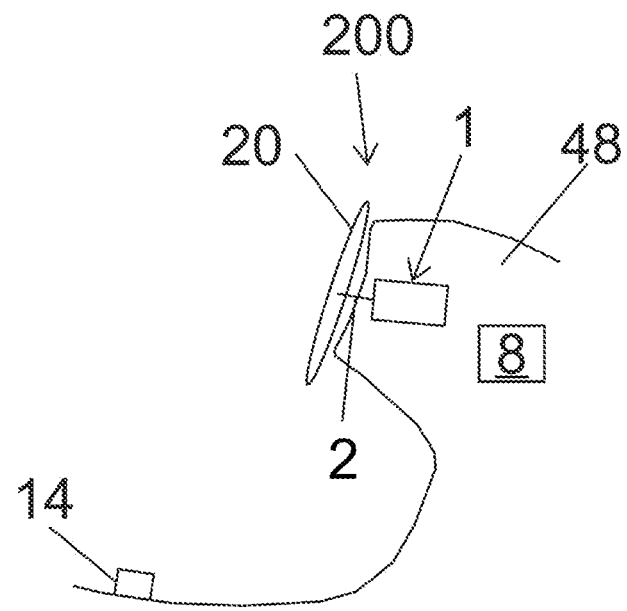
FIG. 4 shows an exemplary embodiment of an installed steering column configured in accordance with the disclosure having a steering control element in a stowed position (FIG. 4a) and in an operating position (FIG. 4b).
Figure 4B:
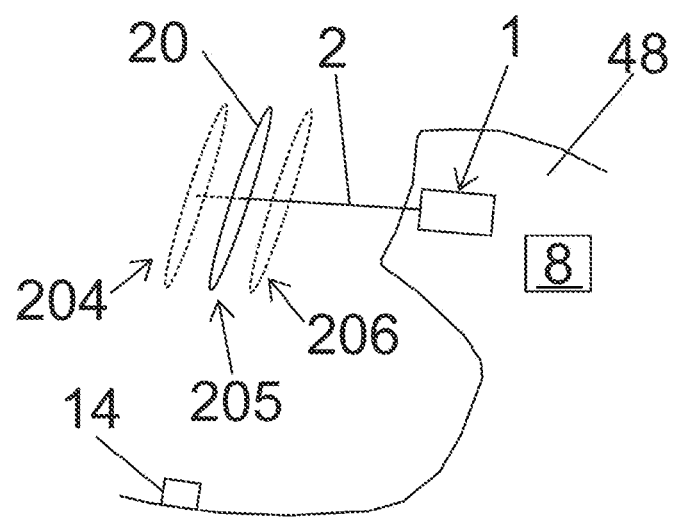

An embodiment of the present disclosure, in particular operation provided in accordance with the disclosure of a steering column 1, will be explained further with reference to FIG. 4a and FIG. 4b. FIG. 4a and FIG. 4b each show, in highly simplified form, a detail of a motor vehicle 48 which comprises a steering column 1 configured in accordance with the disclosure, in particular a steering column as described with reference to FIG. 2 and FIG. 3.

A steering wheel as a steering control element 20 is here arranged on an positioning unit 2 of the steering column 1. In FIG. 4a, the steering control element 20 is arranged in a stowed position 200, which gives a driver maximum space to move. It is provided in particular that the stowed position 200 can be assumed in an autonomous driving mode of the motor vehicle 48, in which no steering interventions by the driver are required.

In FIG. 4b, on the other hand, the steering control element 20 is arranged in an operating position 204, 205, 206, in which a driver is able to steer the motor vehicle 48 manually by way of the steering control element 20. The operating position 204, 205, 206 is preferably specified for each driver individually or is preset by a driver before the vehicle is used for the first time, wherein the actual operating position 204, 205, 206 depends in particular on the height of the driver and on personal preferences of the driver. That is to say, the operating position is in particular not an absolute position but rather is located in an operating range, which can lie in particular between a first position and a second position, for example anywhere between the operating position 204 and the operating position 206.

For the adjustment of the positioning unit 2 from an operating position 204, 205, 206 into a stowed position 200 by means of an adjustment device 7 of the steering column 1 (not shown explicitly in FIG. 4a and FIG. 4b), it is necessary that a control unit 8 of the steering column 1 activates a motor of the adjustment device 7. To that end, it is provided that the control unit generates a first signal S1 and a second signal S2, in particular by means of a logic unit correspondingly configured for that purpose. The first signal S1 is applied to a first switch unit 12, and the second signal S2 is applied to a second switch unit 13. The motor of the adjustment device 7 here adjusts the positioning unit 2 when the first signal S1 is present at the first switch unit 12 and at the same time the second signal S2 is present at the second switch unit S2.

It is provided in particular that the driver of the motor vehicle 48 can send an adjustment request, in order to move the steering control element 20 from the operating position 204, 205, 206 into the stowed position 200. The adjustment request can be sent, for example, by pressing the switch 14. The adjustment request is then received by the control unit 8, wherein, on receiving the adjustment request, the first signal S1 is generated. The adjustment request can in particular also be received by the central control unit of the motor vehicle 48. On the part of the central control unit, it is here checked whether a state is present in which enabling can be authorized. Such a state is in particular autonomous driving operation in which no abnormality has been detected. If such a state is present, then the central control unit sends an enable signal to the control unit 8 of the steering column 1. The enable signal is received by the control unit 8, wherein, on receiving the enable signal, the second signal S2 is generated. Thus, the first signal S1 and the second signal S2 are present at the same time, and the motor of the adjustment device 7 of the steering column 1 is activated by the control unit 8 in such a manner that the positioning unit 2, and thus the steering control element 20, is moved from the operating position 204, 205, 206 into the stowed position 200. However, if the central control unit established that autonomous driving operation was not present, or that autonomous driving operation must be terminated on account of a hazardous situation, then an enable signal is not sent to the control unit 8 of the steering column 1 and the second signal S2 is not generated. Therefore, despite the request signal, the motor of the adjustment device 7 is not activated in such a case, and the positioning unit 2, and thus also the steering control element 20, remain in the operating position 204, 205, 206.

Figure 5:
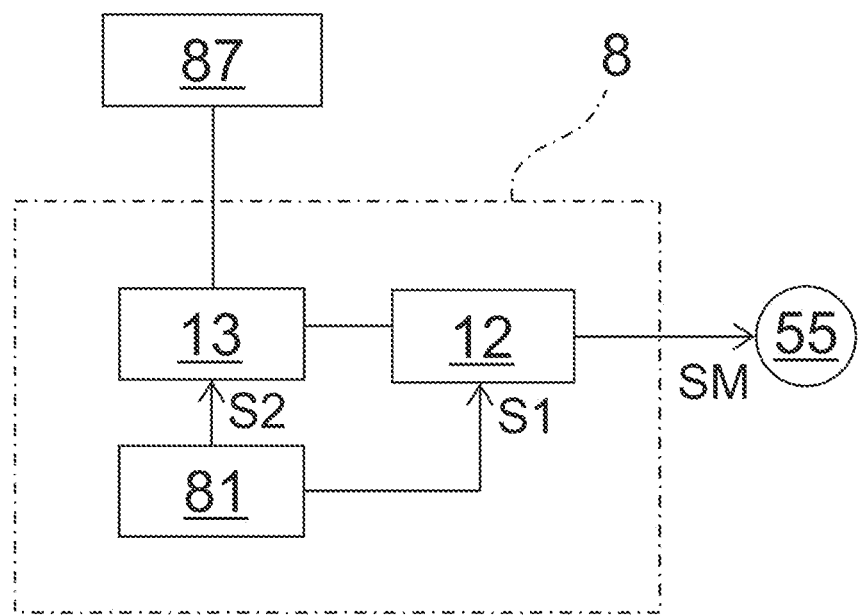
FIG. 5 shows an exemplary embodiment of a control unit, configured in accordance with the disclosure, of a steering column, which control unit activates an electric motor connected to an on-board power supply.

An advantageous exemplary embodiment of a control unit 8 of a steering column configured in accordance with the disclosure will be explained hereinbelow with reference to FIG. 5. There can be provided in particular a control unit 8 so configured for a steering column 1, as described in connection with FIG. 2, FIG. 3, FIG. 4a and FIG. 4b. FIG. 5 shows, schematically, the control unit 8, which in particular is in the form of an ECU (ECU: electronic control unit) of the steering column. The control unit 8 comprises a first switch unit 12 and a second switch unit 13 and also a logic unit 81. The logic unit 81 is configured to switch the first switch unit 12 and the second switch unit 13. It is provided in particular that the first switch unit 12 is an inverter. It is further provided in particular that the second switch unit 13 is a field-effect transistor, preferably a self-closing MOSFET.

The electric motor 55 of an adjustment device of a steering column is connected by way of the first switch unit 12 and the second switch unit 13 to the on-board power supply 87 of a motor vehicle. The electric motor 55, the first switch unit 12 and the second switch unit 13 are connected electrically in series with a voltage source of the on-board power supply 87.

For switching the first switch unit 12, a first signal S1 must be generated by the logic unit 81, and for switching the second switch unit 13, a second signal S2 must be generated by the logic unit 81. In this exemplary embodiment, it is provided that the electrically conducting connection between the voltage source of the on-board power supply 87 and the electric motor 55 is broken both by the first switch unit 12 and by the second switch unit 13 if neither the first signal S1 is present at the first switch unit 12 nor the second signal S2 is present at the second switch unit 13. Thus, in order that the electric motor 55 can be activated for adjustment of an positioning unit of the steering column, and thus also for adjustment of the steering control element, both the first signal S1 must be present at the first switch unit 12 and the second signal S2 must be present at the second switch unit 13 and thus a motor activation signal SM must be produced. The first signal S1 is generated by the logic unit 81 independently of the second signal S2. In particular, it can be provided that, in the case of a change from a manual driving mode of a motor vehicle, in which the steering control element is in an operating position, to an autonomous driving mode, in which the steering control element can be in a stowed position, the first signal S1 is generated automatically by the logic unit 81. The condition for the generation of the second signal S2 can in particular be that the first signal S1 has been generated and in addition a confirmation signal that the motor vehicle is in the autonomous driving mode is received by the logic unit 81. For example, the second signal S2 can be generated by means of an AND gate to which the first signal S1 and the confirmation signal are fed.

Figure 6:
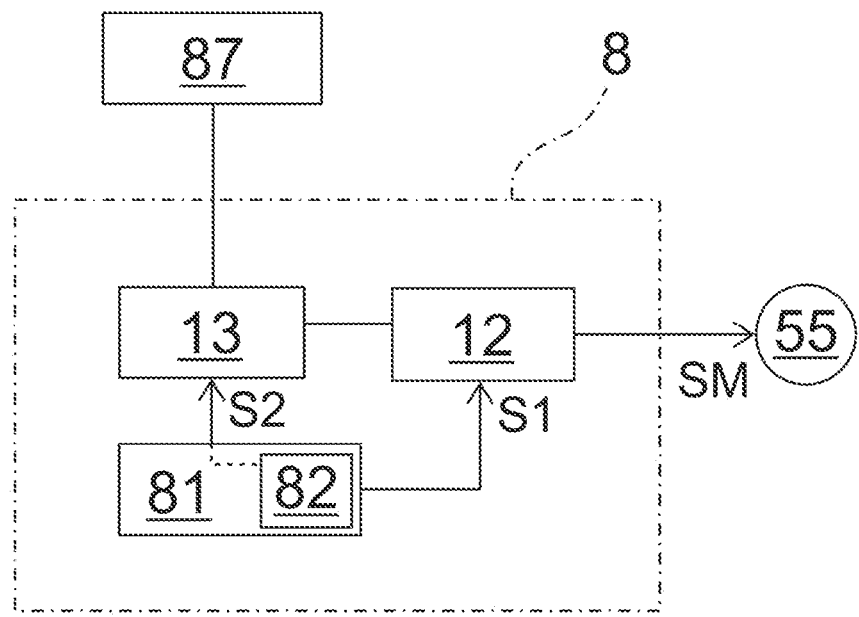
FIG. 6 shows, in a schematic representation, a further exemplary embodiment of a control unit, configured in accordance with the disclosure, of a steering column, which control unit activates an electric motor connected to an on-board power supply.

FIG. 6 shows an embodiment variant of the exemplary embodiment according to FIG. 5. In the embodiment variant according to FIG. 6, it is provided that the control unit 8 additionally comprises a diagnostic unit 82, which in particular can be part of the logic unit 81. It is here provided that the second signal S2 is controlled by the diagnostic unit 82, wherein the second signal S2 is normally always present. The diagnostic unit 82 monitors whether a fault occurs in respect of the activation of the electric motor 55. Such a fault can be, for example, a command to move the steering control element into a stowed position so as to allow easy access to the driver's seat, that is to say a so-called easy-entry function, even though the vehicle is moving. In the case of such a fault, the diagnostic unit 82 interrupts the second signal S2, so that the electrically conducting connection between the on-board power supply 87 and the electric motor is broken and the steering control element is not moved into the stowed position. For the purposes of diagnosis, it can be provided that the second switch unit 13 is briefly connected through. The diagnosis consists in this case in particular of at least one current and/or voltage measurement of at least one first signal S1 present at the first switch unit 12 and/or the second signal S2 present at the second switch unit 13.

The exemplary embodiments shown in the figures and described in connection therewith serve to illustrate the disclosure and do not limit the disclosure.

LIST OF REFERENCE SIGNS 1 steering column
2 positioning unit
3 casing unit
31 outer casing tube
32 intermediate casing tube
33 inner casing tube
34, 35 stop
36 arm
37 steering spindle
38 connection portion
4 support unit
41 fastening means
42 actuating lever
43, 44 pivot bearing
48 motor vehicle
5, 6 adjusting unit
51, 61 spindle nut
52, 62 threaded spindle
53, 63 bearing housing
542 fastening bolt
65 electric motor
7 adjustment device
8 control unit
81 logic unit
82 diagnostic unit
87 on-board power supply
89 voltage source
9 interface
91 interface for connection to an on-board power supply
92 interface for connection to a central control unit of a motor vehicle
10 steering system
12 first switch unit
13 second switch unit
20 steering control element
25 feedback actuator
26 steering actuator
27 wheel
28 screw drive
29 tie rod
70 ground
74 internal thread
L longitudinal axis
S pivot axis
G spindle axis (threaded spindle axis)

S1 first signal
S2 second signal
SM, SM1, SM2 motor activation signal
Z1, Z2 line

What is claimed is:

1. An electrically adjustable steering column for a motor vehicle comprising:
   a positioning unit that supports a steering control element can;
   a support unit by which the positioning unit is held in an adjustable manner;
   an adjustment device configured to adjust the positioning unit relative to the support unit including:
      at least one electric motor; and
      a control unit, wherein the control unit is configured to activate the at least one electric motor, and wherein the control unit is configured to, for the activation of the at least one electric motor, to generate a first signal that represents an adjustment request and a second signal that represents an enable signal indicating that a state is present in which enabling can be authorized, wherein activation of the at least one electric motor requires the presence of the first signal and of the second signal.

2. The steering column of claim 1, wherein the control unit includes a logic unit for generating the first signal and the second signal.

3. The steering column of claim 2, wherein the control unit comprises a first switch unit and a second switch unit, wherein the first switch unit is switched by the presence of the first signal and the second switch unit is switched by the presence of the second signal.

4. The steering column of claim 3, wherein the first switch unit and the second switch unit are connected in series with the at least one electric motor.

5. The steering column of claim 3, wherein the first switch unit comprises an inverter, wherein the inverter and is configured to generate a motor activation signal in dependence on the first signal.

6. The steering column of claim 3, wherein the second switch unit includes a transistor, wherein the second signal is a switching voltage for switching the transistor.

7. The steering column of claim 3, wherein the second switch unit is open when the second signal is not present, and the second switch unit is closed when the second signal is present.

8. The steering column of claim 3, wherein the control unit includes a diagnostic unit, and wherein the diagnostic unit is configured to detect a fault with respect to the activation of the at least one electric motor, wherein the control unit is configured to interrupt a second signal that is present if the diagnostic unit has detected a fault with respect to the activation of the at least one electric motor, and the second switch unit is closed when the second signal is present and the second switch unit is open when the second signal is not present.

9. The steering column of claim 3, wherein the logic unit is configured to activate the first switch unit independently of the second switch unit.

10. The steering column of claim 1, wherein the at least one electric motor is connected in a serial connection, and wherein the at least one electric motor is configured to be connected in series in an electrically conducting manner to a voltage source by way of the serial connection.

11. The steering column of claim 1, wherein the control unit is further configured to generate the second signal when a request signal for adjustment of the positioning unit is received by the control unit and, by way of an interface of the steering column, the enable signal is received by the control unit, wherein the enable signal is a signal generated by a driver of a motor vehicle or a signal generated by the motor vehicle.

12. The steering column of claim 1, characterized by a first interface for connecting the steering column to an on-board power supply of a motor vehicle and/or a second interface for connecting the steering column to a central control unit of a motor vehicle.

13. The steering column of claim 1, wherein the control unit is further configured to activate the at least one electric motor of the adjustment device in such a manner that the positioning unit is moved from a stowed position into an operating position or from an operating position into a stowed position, wherein the control unit is further configured to receive a confirmation signal from a control unit of a motor vehicle by way of an interface of the steering column, wherein the confirmation signal is sent by the control unit of the motor vehicle when the motor vehicle is in autonomous driving operation or the motor vehicle is stationary.

14. The steering column of claim 1, wherein the state is autonomous driving operation in which no abnormality has been detected.

15. The steering column of claim 1, wherein the adjustment request is sent by a central control unit of the motor vehicle on transfer from manual driving operation to autonomous driving operation.

16. A method for operating the steering column of claim 1, comprising:
   for the adjustment of an positioning unit between a stowed position and an operating position, by means of an adjustment device of the steering column, a control unit of the steering column activates at least one electric motor of the adjustment device,
   wherein, for the activation of the at least one electric motor, the control unit generates a first signal that represents an adjustment request and the control unit generates a second signal that represents an enable signal indicating that a state is present in which enabling can be authorized, wherein the first signal is applied to a first switch unit and the second signal is applied to a second switch unit,
   wherein the at least one electric motor adjusts the positioning unit when the first signal is present at the first switch unit and at the same time the second signal is present at the second switch unit.

17. The method of claim 16, wherein the adjustment request is received by the control unit, wherein, on receiving the adjustment request, the first signal is generated, and the enable signal from a driver input or a motor vehicle controller is received by the control unit, wherein, on receiving the enable signal, the second signal is generated.

* * * * *